June 21, 1966     F. KASTEL     3,257,519
INCIRCUIT TESTING DEVICE AND TOOL
Filed June 22, 1964     2 Sheets-Sheet 1

INVENTOR.
FRED KASTEL
BY Julian Caplan
ATTORNEY

June 21, 1966  F. KASTEL  3,257,519
INCIRCUIT TESTING DEVICE AND TOOL
Filed June 22, 1964  2 Sheets-Sheet 2

INVENTOR.
FRED KASTEL
BY Julian Caplan
ATTORNEY

United States Patent Office 3,257,519
Patented June 21, 1966

3,257,519
INCIRCUIT TESTING DEVICE AND TOOL
Fred Kastel, 3434 Edison St., San Mateo, Calif.
Filed June 22, 1964, Ser. No. 376,992
5 Claims. (Cl. 200—61.58)

This invention is a continuation-in-part of copending application No. 283,186, filed May 27, 1963, entitled "Test Probe Entry Connector."

This invention relates to a new and improved electrical testing tool and more particularly comprises a tool for testing electrical circuits and components therein by measuring various electrical quantities and further comprises a device installed in the circuit near or integral with a component to be measured by use of the testing tool.

Electrical components of a circuit tend to become ineffective and must be replaced for various reasons. Devices of this type are various resistance elements, condensers, inductors, and the like. Heretofore, in repairing circuits it has been necessary to isolate the elements suspected of being defective and make tests with instruments, such as ammeters and ohmmeters. Isolation of the element usually has required cutting or disconnecting a wire or conductor and, accordingly, when the test has been completed the wire or conductor must be resoldered, reconnected, or otherwise repaired. These operations are time-consuming. Where the space for access to the component is limited, the performance of the cutting or disconnecting operation and resoldering or reconnecting are extremely difficult. Further, proper resoldering of the connection is sometimes not achieved which introduces a new possibility for trouble in the circuit.

The present invention employs a device which is permanently installed in the circuit in series with the element and is hereinafter sometimes termed a "gate." The gate has fixed electrical contacts which are connected into the circuit and a movable contact which is spring-biased against the fixed contacts. Normally the circuit is closed by the contacts being forced against each other. However, the present invention also uses a tool which forces the spring-biased contact away from the permanent contacts and hence breaks the circuit to the electronic element under test thereby isolating the same and permitting testing instruments to be used. As a further feature, the gate is so constructed that when the spring-biased contact is forced away from the permanent contacts, contacts on the tool establish an electrical connection with lead wires of the tool and may be thus connected to an instrument. In so doing, the gate is bridged continuously and the insertion of the shunt type instrument causes negligible change or transient effect in the circuit and original operation is assured while electrical measurements are being taken of current, resistance, voltage, power, phase, waveform and other quantities. Accordingly, the gate and tool may be used in conjunction with an ammeter so that the current can be measured and further the resistance can be isolated and the resistance measured, in both directions from the gate, thus facilitating the rapid isolation of circuit malfunctions.

The switch or gate may be wired in series with a conventional electronic component, or two may be added, one on either side of a component or network, or may be manufactured as an integral part thereof. The measurement of electrical quantities in networks of wires and cables or groups of components with these gates at selected test points using various bridges, meggers, generators, oscillators and other test equipment is limited only by the ingenuity of the test operator.

A further feature and advantage of the invention is the fact that the dimensions of the device are small and hence the device may be installed in existing circuits, or may be incorporated in new circuits without requiring additional space for wiring.

A still further advantage of this invention is the fact that all exterior surfaces of the gate with the exception of the two leads are electrically insulated so that the possibility of an accidental short to a surface on the tool or to a wire or component coming in contact with the gate is very unlikely.

Other objects of the present invention will become apparent upon reading the following specification and referring to the accompanying drawings in which similar characters of reference represent corresponding parts in each of the several views.

Figures 1, 2:
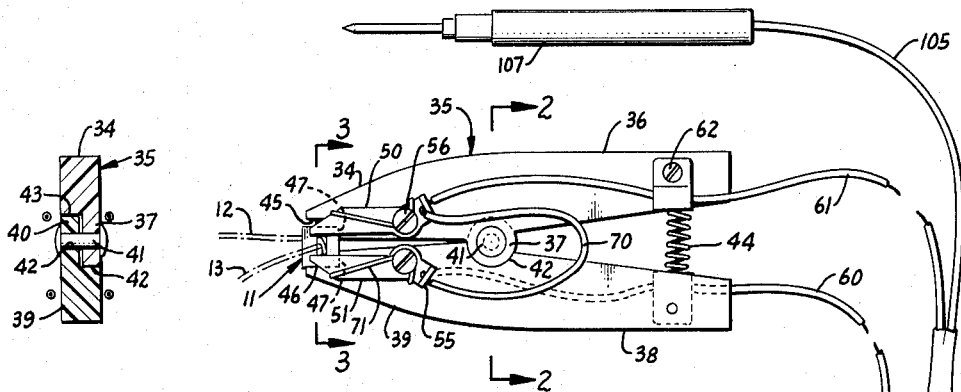
FIG. 1 is a side elevational view showing the gate and the tool applied to the gate.
FIG. 2 is a sectional view of the tool taken substantially along line 2—2 of FIG. 1.

The gate 11 is a small device having lead wires 12 and 13 extending therefrom which are installed in series in an electrical circuit with a resistor, condenser or the like as hereinafter explained. Gate 11 may be formed with non-conductive, three-piece housing consisting of bottom 16, top 17 and inner threaded ring 14, which are joined together by means of threaded portions on the exterior of ring 14 and on the interior of top 17 and bottom 16. Top 17 and bottom 16 may be joined together by means of adhesive, staples, forced fit, or various other means which readily will occur to one skilled in the art. Bottom 16 and top 17 are substantially square in cross-section. Bottom 16 is formed with threaded inner cavity 20 which screws on to ring 14, closing the inner chamber 21, thereby formed in gate 11. Ring 14 is of a substantially cylindrical shape, being threaded on the outside so as to receive threaded portions of top 17 and bottom 16 and having an inner surface forming the inner wall of chamber 21 when gate 11 is assembled. Top 17 is formed with a small diameter top opening 22 which connects into a larger diameter cavity 23 of extended length, having a threaded portion along the lower inner surface of cavity 23 to threadedly engage ring 14. Soldering ears 24 and 25 are formed of lengths of solid conductive wire which form apertures 63 for insertion of lead wires 12 and 13. Ears 24 and 25 extend out through openings 26 in top 17 and are diametrically opposed in top bore 27, which has a large diameter, seen in FIG. 4, and is formed in the upper portion of cavity 23 of top 17.

Non-conductive button 27, slidably fitting in opening 22 of top 17, has an inner cavity 28 which is formed to receive, by a force fit, or other adhesive means, plunger 29. Electrically conductive disc 30 is formed integrally with, or otherwise attached to, plunger 29, and is biased upwardly by means of spring 31, coiled about the axis of plunger 29, and bearing against the bottom of chamber 21. Disc 30 and plunger 29 are biased upwardly by spring 31 such that conductive disc 30 comes into contact with semi-circular portions 32 and 33 of soldering ears 24 and 25 to form an electrically conductive relationship therewith. Lead wires 12 and 13 are soldered to ears 24 and 25 respectively, so as to form a continuous electrically conductive path from wire 12 to ear 24 to ear portion 32, through disc 30 to ear portion 33 to ear 25 to wire 13. This is the normal condition when plunger 29 is not depressed by an outside force.

By means hereinafter described, jaw 34 of tool 35, as hereinafter described in detail, depresses plunger 29 by pressing against button 27 thereby breaking the connection between disc 30 and ear portions 32 and 33 and isolating the electrical component which is in series with gate 11.

Tool 35 is of a lever-type with the upper member having hand grip 36 and upper jaw 34 from which depends side member 37, having a width approximately half that of jaw 34. Lower hand grip 38 has a bottom jaw 39 of a width equal to that of upper jaw 34 and having side member 40 which extends upwardly adjacent side member 37 and has a width approximately half that of jaw 39. Pivot pin 41 passes through hole 42 formed in side members 37 and 40. Jaws 34 and 39 pivot about pivot pin 41, rotating on the surfaces of side members 37 and 40 as they slide in semi-circular grooves 42 and 43 respectively, formed in jaws 39 and 34, respectively.

Spring 44 is connected at either end to top and bottom jaws 34 and 39 and bias the same into contact with one another. When the user exerts pressure on handles 36 and 38, the jaws are forced apart, but when such pressure is released, spring 44 brings the jaws toward each other.

Flat surfaces 45 and 46, on the forward ends of jaws 34 and 39 respectively, bear against button 27 and bottom 16, respectively, of gate 11 when gate 11 is inserted between the jaws of tool 35. As shown in the drawings, gate 11 has a square exterior in top plan and the forward ends of tool 35 are cut away in shoulders 47, formed in flat surfaces 45 and 46, to receive the square edges of gate 11. Preferably, tool 35 is formed principally of non-conductive materials, with the exception of conductive contacts 48, 49, 50 and 51 and associated leads, hereinafter described in detail.

Electrical current is tapped from the circuit for introduction into a meter by means of conductive contacts 48, 49, 50 and 51 which are fastened to tool 35 by means of screws 56. Contacts 48 and 49 bear against soldering ear 24 while contacts 50 and 51 bear against soldering ear 25, each in an electrically conductive relationship thereto. The ends 52 of each of the contacts 48, 49, 50 and 51 are beveled at approximately a 45° angle to increase the contacting surface which bears on ears 24 and 25 and also to allow ends 52 to fit on the inward side of coils 53 which are formed in ears 24 and 25. Contacts 48 and 49 and contacts 50 and 51 are respectively electrically connected by means of lead wires 54 and 70 which are connected to soldering posts 55 formed in contacts 48, 49, 50 and 51. Thus each contact pair, 50 and 51, and pair 48 and 49, is electrically equivalent and is duplicated to increase the conductive surface area bearing on soldering ears 24 and 25 and to provide a backing force for each contact as it is forced against the ears by spring 44. Leads 60 and 61 are connected to contact pairs 48 and 49, and 50 and 51, respectively, and are held flush with hand grips 36 and 38 by means of clips 62. Springs 71, attached to each of contacts 48, 49, 50 and 51, bias each contact toward the soldering ears 24 and 25, to provide a spring force insuring adequate electrical connection and to allow each contact to automatically fully engage different size soldering ears or wire leads as they are inserted.

Figure 4:
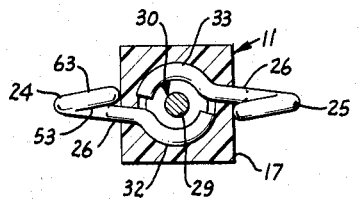
FIG. 4 is a sectional view taken substantially along line 4—4 of FIG. 3.
Figure 5:
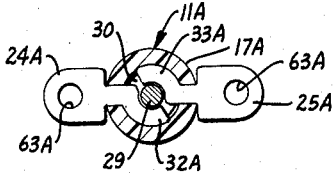
FIG. 5 is a sectional view taken substantially along line 5—5 of FIG. 4A.
Figure 3:
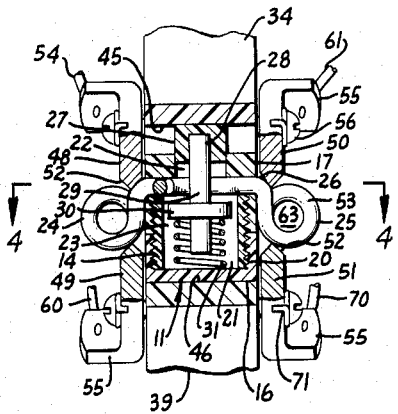
FIG. 3 is an enlarged sectional view taken substantially along line 3—3 of FIG. 1.
Figure 4A:
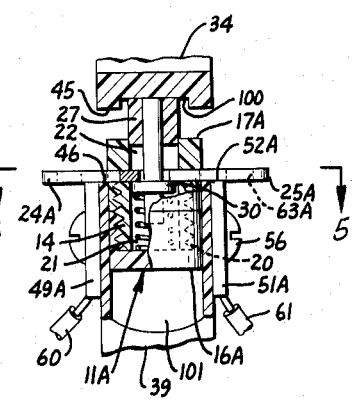
FIG. 4A is an enlarged sectional view of a modified tool and gate similar to FIG. 3.

Directing attention now to FIGS. 4 and 5, which illustrate a modification, corresponding parts have been marked with identical reference numerals followed by the subscript "a" where any variations in construction occur. In this modification, gate 11a is formed with a circular exterior in top plan. Top 17A and bottom 16A are joined together with ring 14 by means of threaded portions on each part as previously described. Soldering ears 24A and 25A are formed of flat portions of conductive material in which soldering holes 63A are drilled through to allow insertion of lead wires 12 and 13. Substantially semi-circular portions 32A and 33A are placed about the axis of gate 11A such thay they are electrically connected by disc 30 when button 27 is not depressed. Electrical contact between leads 12 and 13 is broken by depressing button 27 with tool 35A in this modification in the same manner as hereinbefore described.

Tool 35A is formed with circular depression 100 formed in surface 45 on upper jaw 34. Depression 100 has a diameter larger than the diameter of button 27 such that button 27 fits into depression 100 and is depressed thereby when spring pressure from tool 35A is applied. Surface 46 on lower jaw 39 is cut away in semi-circular recess 101 having a diameter greater than the diameter of gate 11A such that gate 11A fits within recess 101 to position correctly the gate prior to depressing button 27.

Electrical current is tapped from the circuit for measuring by means of conductive contacts 49A and 51A formed with flat ends 52A to bear against soldering ears 24A and 25A respectively.

Referring to portions of FIG. 1, lead 60 terminates in jack 102, while lead 61 terminates in jack 103, which is provided with means 104 to attach jack 102 thereto, effectively short circuit gate 11 when desired, as described in detail below. An additional lead, 105 is physically connected to lead 61 and terminates in jacks 106 and 107. Jacks 102, 103 and 106 are meter connections, while jack 107 is used as a probe to tap the circuit when utilizing a voltmeter or ohmmeter.

Figure 6:
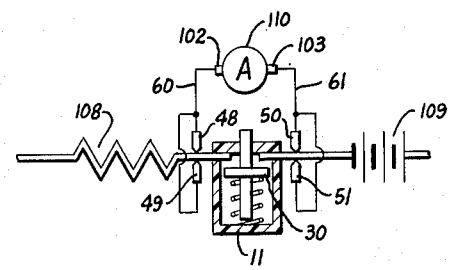
FIG. 6 is a schematic wiring diagram showing the device installed in a circuit being measured with an ammeter.

Directing attention to FIG. 6, gate 11 is installed in series with resistance 108 and a voltage source 109. Leads 60 and 61 are connected to ammeter 110 by means of jacks 102 and 103. When tool 35 is in place on gate 11, plunger 29 is depressed and disc 30 breaks contact with contacts 32, 33. Hence current flows through ammeter 110 and the current flow through the circiut may be measured without removing or breaking the connections between component 108 and source 109.

Figure 7:
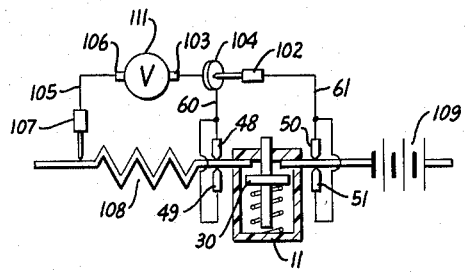
FIG. 7 is a schematic wiring diagram showing the device installed in a circuit being measured with a voltmeter.

Directing attention to FIG. 7, gate 11 is installed as described above and the voltage drop across resistor 108 is to be measured by means of the leads from the tool 35. One input of voltmeter 111 is connected through lead 105 by means of jacks 106 and 107 to one end of resistor 108. The other input of voltmeter 111 is connected through jack 103 to lead 60 at the opposite end of resistor 108. Current is allowed to flow through the resistor by means of a gate by-pass circuit consisting of jack 102 plugged into jack 103 by means of connector 104.

Figure 8:
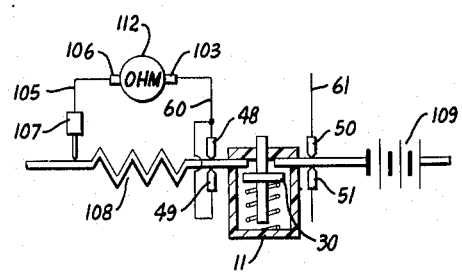
FIG. 8 is a schematic wiring diagram showing the device installed in a circuit being measured with an ohmmeter.

Directing attention to FIG. 8, gate 11 is installed as described above and the resistance in ohms of resistor 108 is to be read directly from ohmmeter 112. One input of ohmmeter 112 is connected to resistor 108 through jack 106, lead 105 and jack 107. The other input of ohmmeter 112 is connected to the opposite end of resistor 108 by means of jack 103 and lead 60. Lead 61 is left unconnected and gate 11 serves as a switch to cut out voltage source 109 while the value of resistor 108 is being measured.

Figure 9:
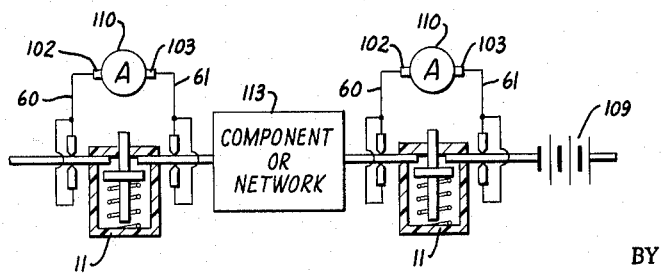
FIG. 9 is a schematic wiring diagram showing a plurality of the devices installed on either side of a network being measured with an ammeter.

Directing attention to FIG. 9, two gates 11 are installed on either side of component or network 113. Current flow in and out of network 113 may be measured substantially as has been described in connection with FIG. 6.

Gate 11 may be installed in series with various other electrical components in addition to resistor 108 and tool 35 may be used with testing and measuring instruments other than ammeter 110, voltmeter 111 and ohmmeter 112. Gate 11 may also be manufactured as an integral part of a component such as resistance 108.

Although the foregoing invention has been described in some detail, by way of illustration and example for purposes of clarity of understanding, it is understood that certain changes and modifications may be practiced within the spirit of the invention and scope of the appended claims.

What is claimed is:

1. An element of a circuit used in testing an electrical component comprising, a casing, a stationary first contact within said casing for connection to a first lead wire, a stationary second contact within said casing for connection to a second lead wire, a movable third contact mounted within said casing for movement toward and away from said first and second contacts, resilient means biasing said third contact toward said first and second contacts, a plunger to engage said third contact and move said third contact away from said first and second contacts, said casing formed with an aperture to slidably hold said plunger and permit said plunger to be moved by means external to said casing and a first soldering ear to connect said first contact to said first lead wire and a second soldering ear to connect said second contact to said second lead wire, and a cooperating tool having pivoted jaws adapted to engage opposite ends of said casing and to engage said plunger to move said third contact, and jaw actuating means to bring said jaws together toward said casing to move said plunger.

2. The combination of claim 1 which further comprises, a first and second conductive contact attached to opposite sides of one of said jaws, said first and second contacts being brought into electrically conductive relationship with said first and second soldering ears respectively, when said jaws are brought together toward said casing.

3. The combination of claim 1 in which at least one said jaw is formed with a socket to receive a portion of said casing and aligns said casing relative to said first jaw portion.

4. A tool according to claim 1 which further comprises spring means biasing said jaws together.

5. A tool of the character described comprising pivotally connected first and second electrically non-conductive jaws, handles for moving said jaws relative to each other, first and second electrically conductive contacts attached to opposite sides of said first jaw, said first and second jaws formed with inwardly and oppositely facing surfaces which move toward each other when said jaws are brought together, and said first and second conductive contacts on opposite sides of said first jaw extend inwardly beyond said inwardly facing surface of said first jaw and move toward the oppositely facing surface of said second jaw when said jaws are brought together.

References Cited by the Examiner

UNITED STATES PATENTS

| | | | |
|---|---|---|---|
| 1,142,306 | 6/1915 | Clemens | 219—234 |
| 2,103,891 | 12/1937 | Brown | 339—255 |
| 2,139,499 | 12/1938 | Howie | 219—234 |
| 2,465,722 | 3/1949 | Hamilton | 219—21.4 |
| 2,546,001 | 3/1951 | Immel | 200—165 |
| 2,569,972 | 10/1951 | Brenner et al. | 339—255 |
| 2,655,572 | 10/1953 | Schwaneke | 200—61.58 |
| 2,782,275 | 2/1957 | Vance | 200—46 |
| 2,798,136 | 6/1957 | Tarbox | 200—158 |
| 2,844,695 | 7/1958 | McLean | 219—541 |
| 3,045,079 | 6/1962 | Frantz et al. | 200—168 |
| 3,124,989 | 3/1964 | Thumim | 200—61.58 |

BERNARD A. GILHEANY, *Primary Examiner.*

B. DOBECK, *Assistant Examiner.*